Aug. 22, 1961　　　F. Y. MASSON　　　2,997,698
TELEMETERING SYSTEM
Filed Jan. 30, 1956　　　　　　　　　　　2 Sheets-Sheet 1

FREDERICK Y. MASSON
INVENTOR.

BY
Rudolph J. Jurich
ATTORNEY

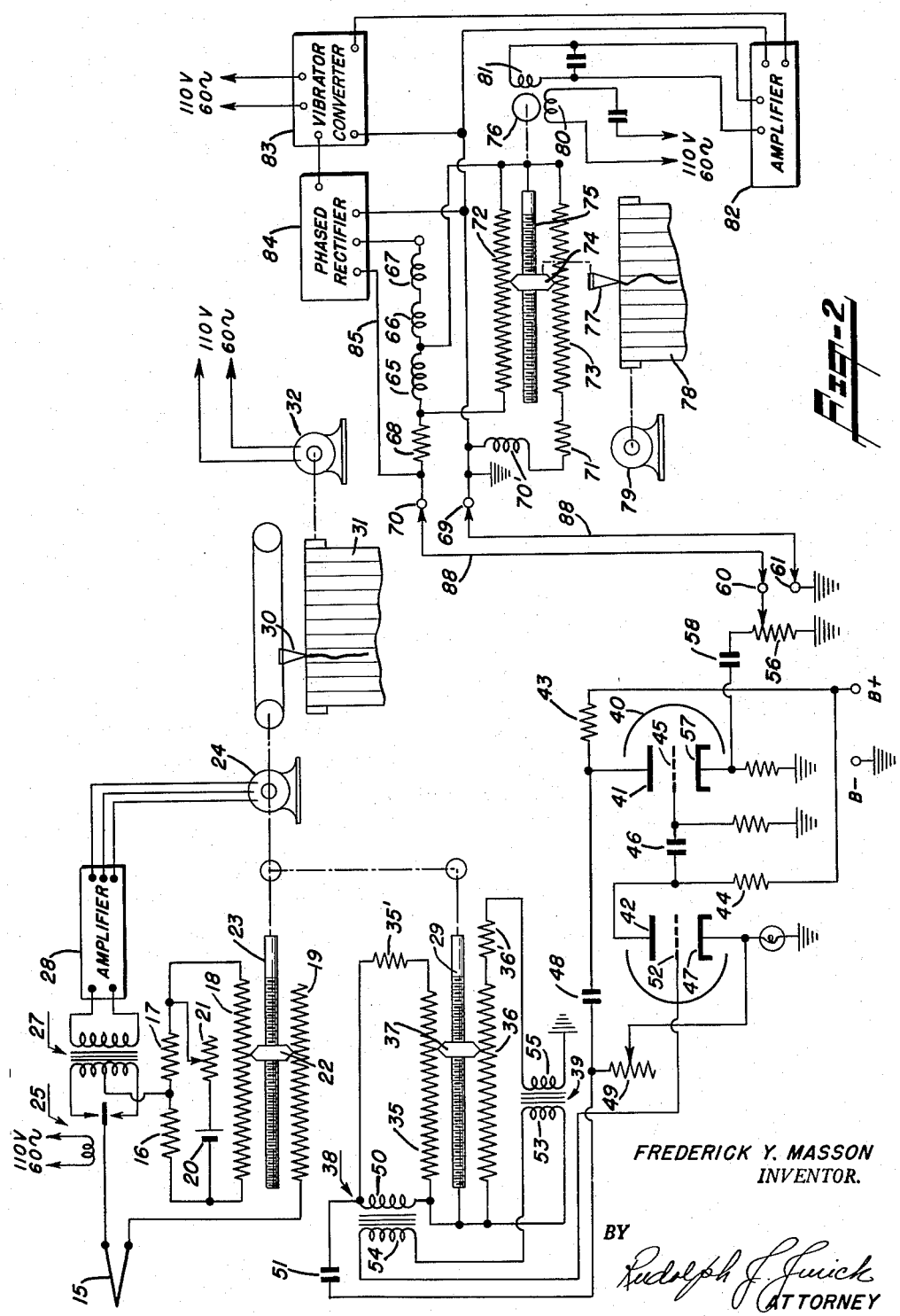

United States Patent Office 2,997,698
Patented Aug. 22, 1961

2,997,698
TELEMETERING SYSTEM
Frederick Y. Masson, Orange, N.J., assignor, by mesne assignments, to Daystrom, Incorporated, Murray Hill, N.J., a corporation of New Jersey
Filed Jan. 30, 1956, Ser. No. 562,113
3 Claims. (Cl. 340—187)

This invention relates to a telemetering system and more particularly to a novel system for transmitting from one point to a remote point changes in a variable condition and for simultaneously recording, or otherwise presenting in visual form, the instantaneous magnitude of the condition at both points.

The system to be described in detail hereinbelow utilizes a resistance-inductance network having a linear resintance/frequency characteristic. Such network is incorporated in an oscillator circuit to provide changes in the oscillator frequency in accordance with changes in a variable condition being measured. These variable frequency oscillations may be transmitted to a remote point to produce an indication and/or record of the changes in the variable condition.

For purposes of indicating or metering frequency variations, three broad types of null transfer networks are appropriate, depending upon the frequency range spread required. Specifically, in the case of relatively narrow range spreads, inductance-capacitance-resistance (L-C-R) networks are generally applicable. On the other hand, the saturating transformer type of network is believed best suited for relatively broad range spreads and particularly when a zero frequency mark is desired on the scale of the indicating instrument. However, for medium range applications wherein the maximum deviations with respect to a center or null frequency have a ratio of about 0.15 to 1.0, the resistance-reactance (R-X) networks are most appropriate.

Of the R-X networks, the bridged-T and the Wien bridge R-C networks are best known and widely used. However, in all R-C networks both the resistance and capacitance are linearly related to periodicity rather than frequency, and when it is desired to calibrate a resistor in such a network in terms of frequency, a reciprocal scale distribution results. This is particularly objectionable in servo recorders where it is desired to match a linear chart paper.

The R-L (resistance-inductance) network of the present case consists of two linear resistors and two mutual inductors so connected as to form frequency-determining constants. The resistors can be any dual, linear resistive elements, such as recorder slide-wires or multiple-turn potentiometers. The mutual inductors should be of good quality and have means to adjust the air gap to provide tracking balance. The network develops a null condition when its R-L ratio is in resonance with the input frequency signal.

In an application for use with recorders, the R-L network is incorporated in a modified R-L oscillator to develop frequency signals in response to resistance changes of the R-L network. These resistance changes may be made by mechanically coupling the dual resistance elements of the R-L network-oscillator to the servo-drive of a self-balancing recorder. Therefore, with changes in recorder input, the servo-motor will drive one way or the other to provide self-balancing. Since the oscillator resistor elements are so coupled to the same servo-drive, the oscillator will develop A.-C. frequencies in proportion to the recorder balance position. These frequency signals from the oscillator output circuit may in turn drive a digital type of counter for corresponding presentation, or such signals may operate another recorder, frequency meter, etc.

An object of this invention is the provision of a recorder responsive to changes in a variable condition said recorder including a novel resistance-inductance, null frequency network having a linear frequency/resistance characteristic with means for remotely controlling a member to indicate the instantaneous value of the variable condition.

An object of this invention is the provision of an oscillator circuit including a resistance-inductance network having a linear resistance/frequency characteristic and including means to vary the resistance value of the network.

An object of this invention is the provision of a telemetering system comprising a recorder responsive to changes in a variable condition, a pair of resistors simultaneously adjustable by the drive motor of the recorder, an oscillator circuit including a resistance-inductance network having a linear resistance/frequency characteristic, said resistors constituting the resistance elements of the said network, and means responsive to changes in the output frequency of the oscillator circuit for presenting a visual indication of the value of the variable condition.

An object of this invention is the provision of an electrical system for simultaneously providing at two spaced points a visual indication of the instantaneous value of a variable condition, said system comprising a potentiometric slide-wire recorder responsive to changes in the variable condition, an additional pair of slide-wire elements adjustable simultaneously with the normal slide-wire, an oscillator circuit including a resistance-inductance network having a linear resistance/frequency characteristic, said network including the additional pair of slide-wire elements as the network resistance parameters, and remote means responsive to the output frequency of the oscillator circuit to provide a visual indication corresponding to the record make on the chart of the recorder.

An object of this invention is the provision of a second pair of slide wires on a potentiometric recorder, which slide wires are simultaneously adjustable by the rebalancing mechanism of the recorder, an electronic oscillator circuit including the said second pair of slide wires and a pair of inductors connected to form a null-frequency R-L network having a linear resistance/frequency characteristic, a remotely-disposed second recorder responsive to the output signal of the oscillator circuit, a second similar null-frequency network in the second recorder, and means automatically rebalancing the second recorder to produce a chart record corresponding to that of the first recorder.

These and other objects and advantages will become apparent from the following description when taken with the accompanying drawings illustrating the invention. It will be understood the drawings are for purposes of illustration and are not to be construed as defining the scope or limits of the invention, reference being had for the latter purpose to the claims appended hereto.

In the drawings wherein like reference characters denote like parts in the several views:

FIGURE 2 is a circuit diagram of a telemeter-recorder made in accordance with this invention.

Figure 1:
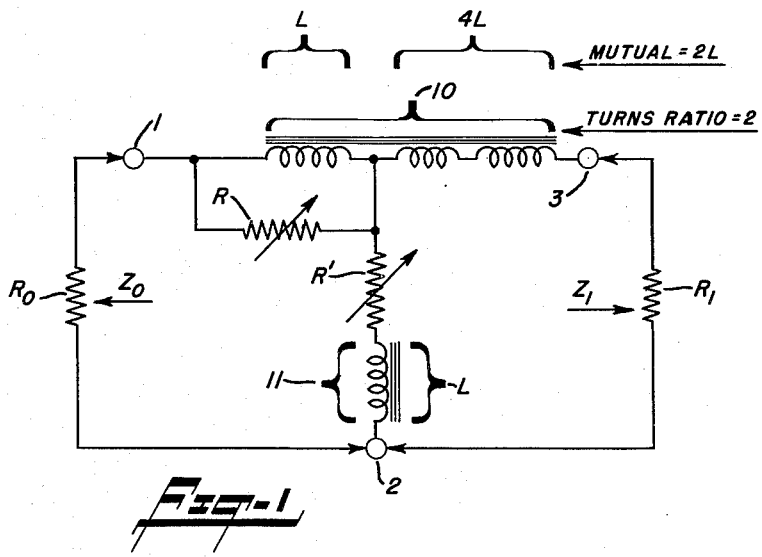
FIGURE 1 is a circuit diagram of the basic R-L (resistance-inductance) network.

Referring to FIGURE 1, the basic null-frequency network comprises the mutual inductance 10, self-inductance 11 and two equal, adjustable resistors R and R'. The inclusion of the mutual inductance results in a 3-terminal network having certain advantages which will appear hereinbelow. For a resonant frequency null, the mutual inductance has a turns ratio of 2, giving a self-inductance ratio of 4, assuming unity coupling. The resonant frequency-resistance relationship for this circuit is:

$$\frac{f}{R} = \frac{1}{2\pi L} = \text{constant} \quad (1)$$

in contrast to R-C circuits wherein the product rather than the ratio of frequency and resistance is a constant.

In general, resistance-reactance networks are ideal only when properly terminated so as to operate in so-called symmetrical condition. Otherwise, the circuit can introduce phase shifts larger than 90 degrees at very high or very low frequencies thereby causing instability in feedback systems. When the FIGURE 1 network is loaded symmetrically, as by the input resistance $R_0$ and the output resistance $R_1$, the transfer impedance locus is a simple circle and the magnitude is equal at zero and infinite frequencies. The criterion for this network is, therefose, $$R_0 \times R_1 = (3R)^2 \quad (2)$$

wherein $R_0$ and $R_1$ are the terminating resistances. This condition should be observed at least approximately at the center of the frequency range.

As the network is linear and passive its transfer impedance obeys reciprocity and it may be used in either direction. However, the network includes transformation in the mutual reactor and it has different self-impedances looking into each end, $Z_1$ and $Z_0$, as shown. The impedances are in the ratio, $$\frac{Z_0}{Z_1} = \frac{1}{2} \quad (3)$$

with $$Z_0 = \frac{3}{2}(R + jR) \quad (4)$$

and $$Z_1 = 3(R + jR) \quad (5)$$

at the resonant frequency.

When the network is applied to sources and loads where power economy is important, the terminating resistances $R_0$ and $R_1$ should be proportioned for optimum energy transfer about the resonant freqdency. In this case, from Equation 3, above, $$\frac{R_0}{R_1} = \frac{1}{2}$$

and from Equation 2, above, $$R_0 = \frac{3R}{\sqrt{2}} \quad (6)$$

and $$R_1 = 3\sqrt{2R} \quad (7)$$

In practice, the reactor windings have some resistance and core loss as a result of which the network will not balance exactly at the theoretical value. However, it has been found practical to finally adjust the network experimentally to a point where equal increments of R will give a tracking balance, and the result will still be fairly linear. In practice, also, the reactors should have a reasonably good quality at the operating frequency by using appropriate-size cores and a suitable air gap ratio.

In the application of the network to a recorder the adjustable balancing resistors R and R' may be in part the dual slide wires of the potentiometer and in part fixed resistors proportioned to provide the desired range spread.

Reference is now made to FIGURE 2 wherein there is shown a conventional potentiometric, self-balancing recorder for recording on a chart the instantaneous value of a variable condition as for example, the temperature of a furnace. In this case, the electromotive force developed by the thermocouple 15 will vary with the temperature of the furnace, not shown. As is well known by those skilled in this art, the thermocouple voltage is balanced against the voltage drop, developed across a measuring network comprising the resistors 16, 17, 18 and 19 which form a bridge having its opposed junctions connected to a standard voltage cell 20 through an adjustable resistor 21. The two resistors 18 and 19 generally are slide wires mounted in parallel relationship on the peripheral surface of an insulator disc and these resistors are bridged electrically by a slider 22 operating on a screw 23 that is rotated in one direction or the other by a drive motor 24. Any unbalance, or error, voltage between the thermocouple and the measuring circuit is converted to a corresponding pulsating voltage by a conventional chopper, or vibrator 25. Thus, an error voltage corresponding in directon and magnitude is applied through the transformer 27 to the input of a suitable amplifier 28 which amplifier controls the directional rotation of the drive motor 24. Rotation of the motor 24 imparts a corresponding linear movement to the slider 22 to maintain, at all times, a voltage balance across the measuring network. Synchronized with the movement of the slider is a marking device, such as a pen 30 which forms a record on a chart 31 is moved at a constant linear speed by a synchronous motor 32.

What has been described is a conventional, self-balancing recorder and while there is specifically shown a temperature recorder it is apparent that such device can be used to record the instantaneous value of any variable condition convertible to a corresponding voltage. A second pair of slide wire resistors 35, 36 are disposed within the recorder, these resistors being bridged electrically by a slider 37 operating on a screw 29 that is mechanically coupled to the drive motor 24. Consequently, the two sliders 22 and 37 operate in unison. The resistors 35, 36 correspond to the two resistors R and R' shown in FIGURE 1 and these resistors are connected to the inductances 50 and 55 of transformers 38 and 39 to form the null frequency network already described. Such network is incorporated in a modified Wien Bridge oscillator so that linear changes in the effective value of the resistors 35, 36 results in proportional changes in the oscillator frequency.

The oscillator circuit consists of a two stage resistance-coupled amplifier using both negative and positive feedback. The anodes 41, 42 of the dual element tube 40, which may be a type 6SN7, are connected to the positive terminal of a suitable biasing voltage source through the respective load resistors 43, 44. The first stage anode 42 is connected to the grid 45 of the second stage through the blocking capacitor 46, whereas the second stage anode 41 is connected to the cathode 47 of the first stage through the blocking capacitor 48 and the adjustable resistor 49. The latter connection provides negative feedback to stabilize the operation of the oscillator. The positive feedback is applied through the frequency determining R-L network comprising the resistors 35, 36 and the coils of the transformers 38, 39. It will be noted that the anode 41 and cathode 47 are connected to one side of the coil 50 of the transformer 38 through the capacitor 51, said coil being shunted by the resistors 35 and 35'. The other side of the coil 50 is connected to the grid 52 in series with the coils 53, 54 and on to ground through the resistors 36 and 36' and coil 55. An output potentiometer 56, connected to the cathode 57 through the blocking capacitor 58, provides a means for adjusting the voltage across the output terminals 60, 61 of the oscillator circuit.

The constants of the various circuit elements are chosen so that the oscillator circuit will oscillate at a predetermined frequency when the temperature at the thermocouple 15 is a definite value as, for example, the normal operating temperature of the furnace, say 400° F. Thus, assuming the furnace temperature remains constant at 400° F., the pen 30 will draw a record line at the 400 degrees reference line on the chart 31 and the oscillator will oscillate at the predetermined frequency. If, now, the temperature of the furnace changes, the drive motor 24 will move the slider 22 to establish a new balance point whereupon the record drawn by the pen 30 will indicate the new furnace temperature. Simultaneously, the slider 37 will change the effective value of the resistors 35 and 36, thereby changing the oscillator frequency. Since the R-L network controlling the oscillator has a linear resistance/frequency ratio the change in the oscillator frequency will be directly proportional to the change in thermocouple temperature. This proportional change in the oscillator output is utilized to actuate a second recorder located at a remote point. The range resistors 35', 36' determine frequency range of the oscillator circuit.

The second recorder also includes the R-L network as shown in FIGURE 1. Here the network mutual inductance is shown as comprising the coils 65, 66, 67 connected in series with the resistor 68 across two terminals 69, 70 of the network. The self inductance comprises the coil 70' connected between the network terminal 69 and the resistor 71. The network resistors 72, 73 are bridged by the slider 74 operating on the screw 75 driven by the motor 76. Such slide wire is similar in mechanical construction and arrangement to the two devices actuated by the drive motor 24 of the main, or transmitting, recorder. A balancing movement of the slider 74 results in a corresponding linear movement of the inking pen 77 which draws a line on the continuously moving strip chart 78 driven at a constant speed by the synchronous motor 79. The chart 78 is calibrated in markings similar to those of the chart 31.

The drive motor 76 may be provided with two field windings 80, 81, the winding 80 being energized directly and continuously by a 110 volt, 60 cycle, power line and the winding 81 being connected to the output of an amplifier 82. A vibrator-converter 83 is also energized from the 100 volt, 60 cycle source, the character of the current being fed to such vibrator being controlled by a phased rectifier 84 that is connected to the recorder input terminal 70 by the lead 85. It may here be pointed out that the control elements of this recorder, specifically the phased rectifier 84, converter 83, amplifier 82 and drive motor 76, constitute conventional arrangements well known in the art and, therefore, the block diagram showing is deemed adequate for purposes of description.

The recorder input terminals 69 and 70, which correspond to the network input terminals 1 and 2 shown in FIGURE 1, are connected to the output terminals of the oscillator circuit by leads 88. The inductances of the network are assigned values such that at a given frequency of the oscillator circuit the pen 77 will occupy a selected position relative to the cooperating chart 31. Any variation in the frequency of the oscillator, brought about by a rebalancing of the transmitting recorder, will produce an A.-C. error voltage that is applied to the phased rectifier 84. The rectifier develops a D.-C. error voltage which varies in sense and magnitude with the A.-C. error voltage and such D.-C. error voltage is converted into a corresponding A.-C. voltage by the vibrator 83 and applied as a signal to the A.-C. amplifier 82. Consequently, an amplified voltage is applied across the winding 81, of the drive motor 76, such voltage having a definite phase relation to that applied across the other motor winding 80. Therefore, the motor 76 rotates in a direction such as to move the slider 74 along the network resistors 72, 73 to reestablish a null balance of the R-L network. Inasmuch as the R-L network has a linear resistance/frequency characteristic, the movement of the pen 77 along the chart 78 will be in strict correspondence to the change in the oscillator frequency and such change in oscillator frequency is, in turn, in strict correspondence to the change in the resistors 35, 36.

From the above description it will now be apparent that I have provided a novel telemetering system wherein changes in a variable condition may be presented in visual form at two or more separated points. At one point, which may be considered the transmitting point, a visual record of the instantaneous value or state of the condition is produced by a conventional, self-balancing recorder and at the remote or receiving point a similar record is made through a conversion of the condition changes to corresponding frequency changes and a subsequent reconversion of the frequency changes to corresponding visual presentation.

While I have described a specific embodiment wherein simultaneous records of the instantaneous values of a variable condition are made at two spaced points, it will be apparent the inventive concept is not restricted to this particular arrangement. For example, it is quite apparent other types of visual-presentation devices may be employed particularly at the receiving end of the system. Specifically, a suitable frequency meter having a scale calibrated in any desired factors, or any other frequency-responsive device, may be used in place of or in conjunction with the receiving recorder.

Figure 3:
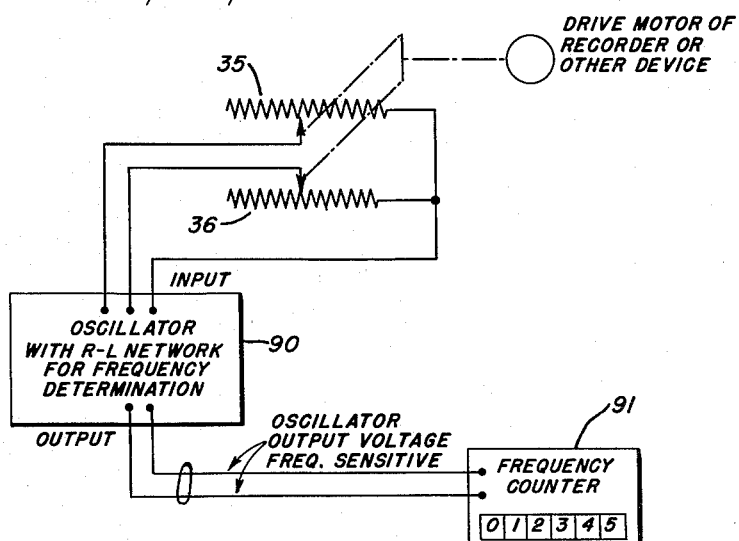
FIGURE 3 is a block diagram showing another embodiment of the invention.

FIGURE 3 is a block diagram illustrating another embodiment of the invention. The R-L network resistors 35, 36 correspond to the resistors shown in FIGURE 2. The sliders which bridge these resistors are shown mechanically coupled to a drive member which may be the drive motor of a recorder or other device responsive to changes in a variable condition and which changes are to be transmitted to a remote point. The inductors which constitute the other elements of the R–L network are shown included with the oscillator 90 together with other components of the oscillator circuit. Movement of the sliders in one direction or the other results in a corresponding frequency change in the output voltage of the oscillator circuit. Such output voltage is applied to a frequency counter 91 to produce a digital presentation.

From the above description, those skilled in this art will find no difficulty in adapting the telemetering system to other applications. The actual adjustment of the ohmic values of the two resistors forming a part of the R-L network may be accomplished by any suitable means responsive to changes in variable conditions. Thus, a combination recorder-controller may be used as the driving means to thereby provide a control function coupled with a multiple visual-presentation. Any varible condition, the changes of which can be converted to corresponding electrical quantities, can be measured, indicated and/or recorded at a plurality of points. For example, the thermocouple shown in FIGURE 2 may be replaced by a tachometer generator which develops a voltage in correspondence with the rotational speed of a member. Still further, it will be apparent that direct conductive connections need not be made between the oscillator circuit and the remotely-positioned receiver. Radio transmission, coupled with suitable amplifiers may be utilized without departing from the essential features of the invention.

Having described my invention in detail in accordance with the requirements of the patent statutes, what I desire to protect by Letters Patent of the United States, is set forth in the following claims.

I claim:

1. In combination, a member movable in one or the other direction in response to changes in a variable condition, an electronic oscillator circuit, a pair of variable resistors and a pair of inductors connected to form a null-frequency, resistance-inductance network in which the null frequency varies linearly with resistance, circuit elements connecting said network in the oscillator circuit to control the oscillation frequency, means coupling the said variable resistors to the said member so as to simultaneously vary the value of said resistors in the same sense upon movement of said member, and means responsive to the oscillation frequency of the oscillator circuit, the last-mentioned means comprising a recorder including a second pair of variable resistors bridged by a second slider, a pair of inductors, circuit elements connecting the said variable resistors and inductors to form a second null-frequency, resistance-inductance network in which the null frequency varies linearly with resistance, a drive motor mechanically coupled to the slider bridging the said second variable resistors, and means responsive to the oscillation frequency of the oscillator circuit and controlling the energization of said drive motor to move the said second slider along the associated variable resistors to maintain said second network in resonance with the oscillator circuit frequency.

2. A telemetering system comprising a member movable in one or the other direction in response to changes in a variable condition, a pair of parallel-disposed, variable resistors bridged by a slider, a pair of inductors connected to the variable resistors to form a null-frequency, resistance-inductance network having a linear resistance to frequency characteristic, an electronic oscillator circuit in which the said network is connected to control the oscillation frequency, and frequency-responsive means responsive to the oscillation frequency of the oscillator circuit, the arrangement being such that movement of the movable member simultaneously varies the value of said variable resistors thereby correspondingly changing the oscillator circuit frequency to effect a corresponding response in the frequency-responsive means, the said frequency-responsive means comprises a recorder including a second pair of parallel-disposed, variable resistors bridged by a second slider, a second pair of inductors connected to the second pair of variable resistors to form a second null-frequency, resistance-inductance network having a linear resistance to frequency characteristic, and means responsive to changes in the frequency of the oscillator circuit and effective to move the said second slider to bring the said second network in resonance with the oscillator circuit frequency.

3. A telemetering system for simultaneously presenting at two remote points the instantaneous value of a variable condition, said system comprising a potentiometric, self-balancing recorder with a pen continuously recording the instantaneous value of the condition and including a drive motor, a pair of parallel-disposed, variable resistors disposed within said recorder and bridged by a slider, a second pair of parallel-disposed variable resistors bridged by a second slider, means mechanically-coupling both of the said sliders to the said drive motor whereby said sliders are moved in correspondence with the recorder pen, a pair of inductors connected to the said second pair variable resistors to form a null-frequency, resistance-inductance network having a linear resistance to frequency characteristic, an electronic oscillator circuit in which the resistance of said network forms the oscillation frequency determining factor, and oscillator-circuit-connected means responsive to the oscillator circuit frequency for exhibiting in visual form the value of the said condition, the said frequency-responsive means comprises a second recorder including a third pair of parallel-disposed, variable resistors bridged by a third slider, a pen movable over a chart, a second drive motor, means mechanically coupling the said third slider and pen to the second drive motor, a pair of inductors connected to the said third pair of variable resistors to form a second null-frequency, resistance-inductance network having a linear resistance to frequency characteristic, and means responsive to changes in the frequency of the oscillator circuit to energize the said second drive motor of the second recorder thereby to move the said third slider to maintain the second network in resonance with the oscillator circuit frequency.

References Cited in the file of this patent

UNITED STATES PATENTS

| | | |
|---|---|---|
| Re. 23,850 | Roper | July 13, 1954 |
| 2,200,863 | Schuck | May 14, 1940 |
| 2,447,098 | Silverman | Aug. 17, 1948 |
| 2,566,420 | Keinath | Sept. 4, 1951 |
| 2,602,139 | Hodder | July 1, 1952 |
| 2,611,021 | Perls | Sept. 16, 1952 |
| 2,611,812 | Hornfeck | Sept. 23, 1952 |
| 2,887,642 | Ehret | May 19, 1959 |
| 2,918,624 | Mayes | Dec. 22, 1959 |

OTHER REFERENCES

"Bridge Oscillator," Electronics, August 1952 (page 134/135).

"Telemetering" by P. A. Borden and G. M. Thynell, Reinhold Publishing Corp., page 149.